Oct. 28, 1969     T. J. LARSEN     3,475,102
MEASURING ASSEMBLY FOR SPECTROPHOTOMETRIC ANALYZING APPARATUS
Filed June 22, 1966     5 Sheets-Sheet 1

INVENTOR
THEODORE J. LARSEN
BY
ATTORNEY

INVENTOR
THEODORE J. LARSEN

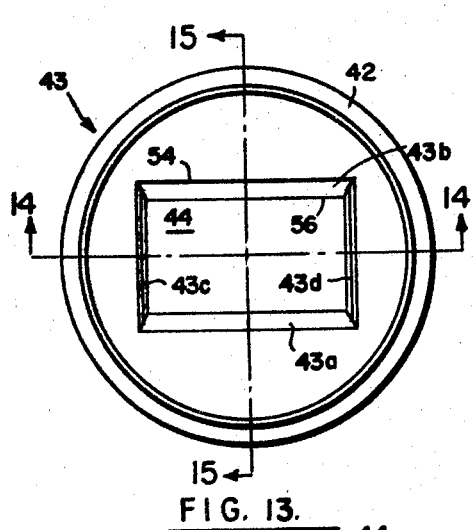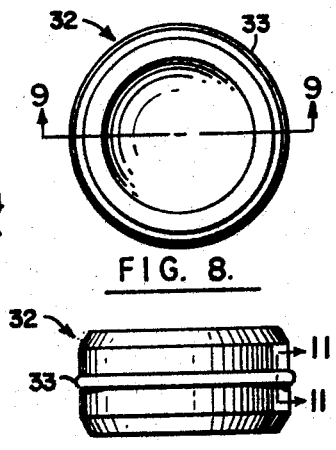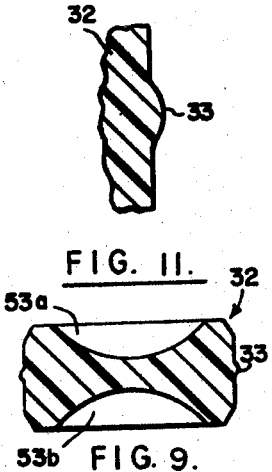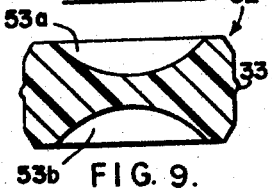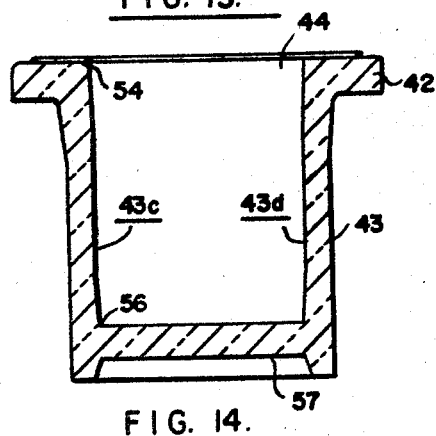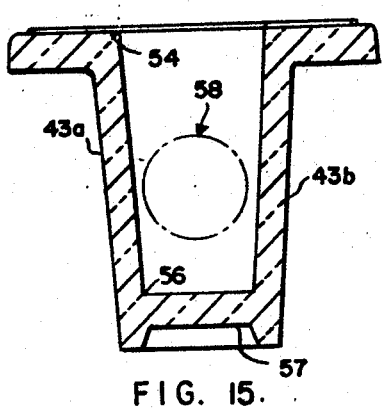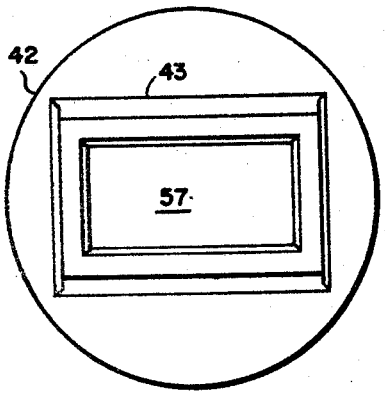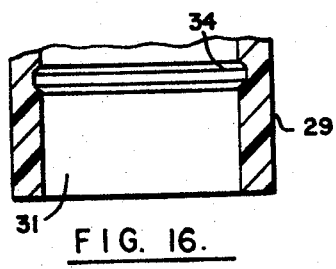

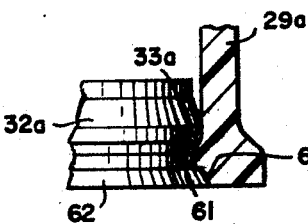
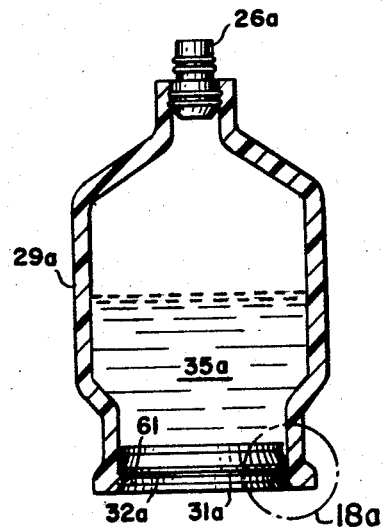
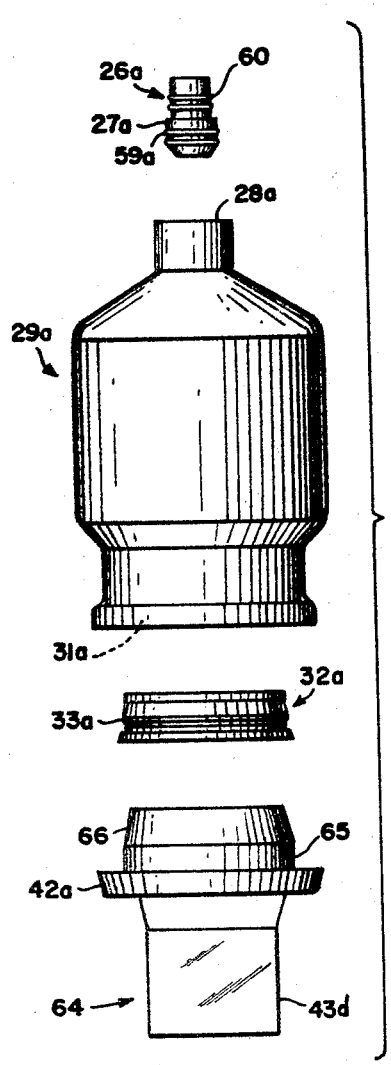
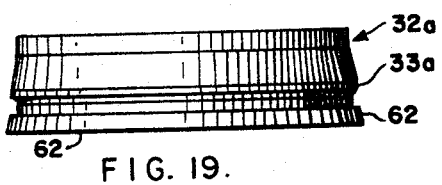
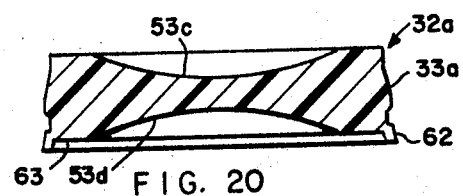

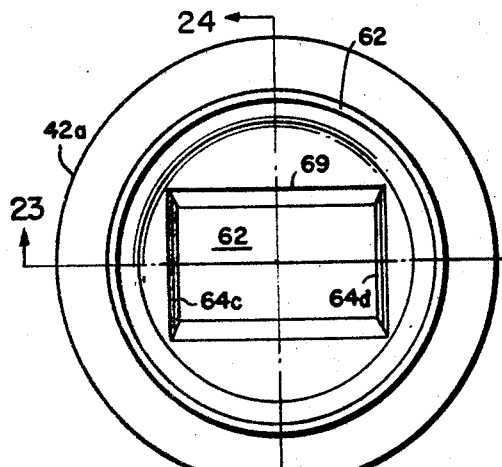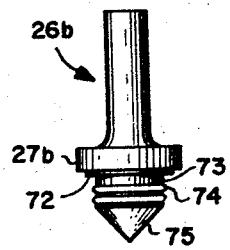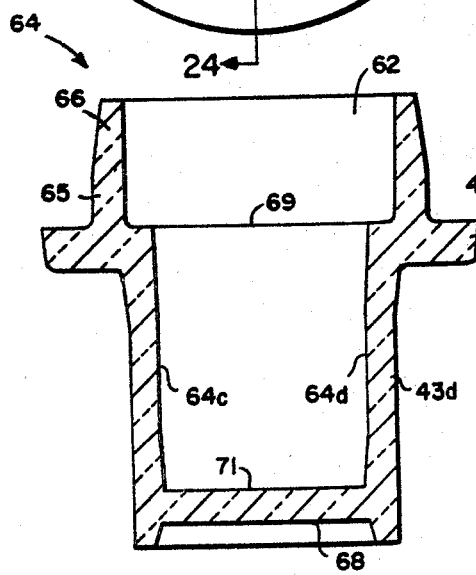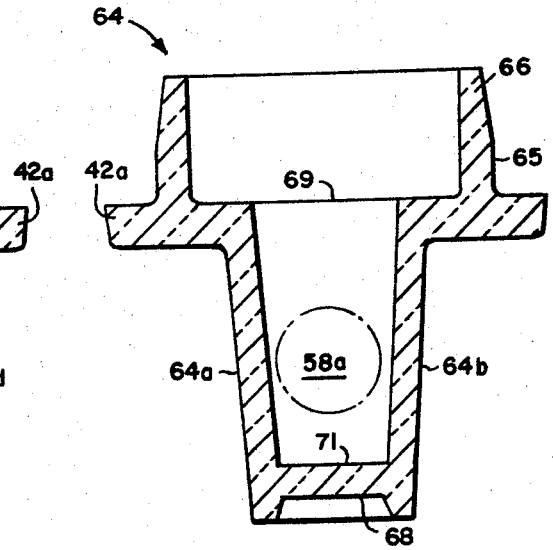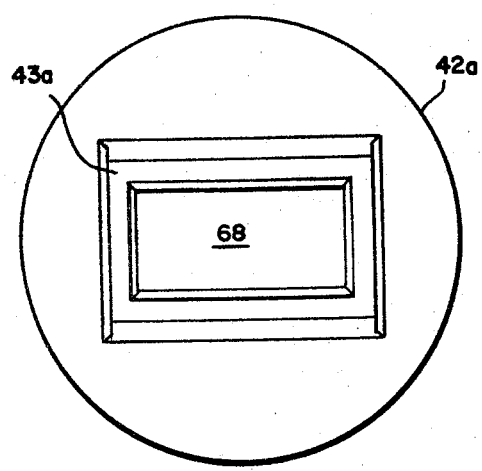

United States Patent Office 3,475,102
Patented Oct. 28, 1969

3,475,102
MEASURING ASSEMBLY FOR SPECTROPHOTO-
METRIC ANALYZING APPARATUS
Theodore J. Larsen, Cherry Hill, N.J., assignor to Smith
Kline & French Laboratories, Philadelphia, Pa., a corporation of Pennsylvania
Filed June 22, 1966, Ser. No. 559,469
Int. Cl. G01n 1/10, 21/06, 21/26
U.S. Cl. 356—246
12 Claims This invention relates to a novel means of providing for sampling and measuring for an unknown in a liquid. In another aspect it provides a sampling pipette, and a novel mixing and measuring assembly for use in the spectrophotometric determination of an unknown.

In prior art photometric analyzing apparatus, the specimen to be analyzed is combined with an assay material and is placed in individual optical test tubes, or other optical receptacles. The tubes or receptacles are then individually placed in the apparatus for analysis. Variations in the transmission characteristics of the test tubes or receptacles introduce errors in the final determinations. The process of individually preparing and mixing the various samples and reagents is time consuming and in itself may lead to errors.

By way of example, in the instance of an enzyme assay, an assay material containing a supplied substrate and a coenzyme is dissolved to form a liquid reagent, then the reagent is mixed with the specimen, causing it to react with the unknown amount of enzyme in the specimen.

The supplied coenzyme is effective to enter into the reaction to be converted from one form to another form. The extent to which the coenzyme is converted is determined by the extent to which the assay reaction progresses. The coenzyme may be readily converted from one form (such as oxidized) to another form (such as reduced).

In addition, the coenzyme has a light absorption band at some particular wavelength only when it is in one of these two chemical forms. When it is in the alternate form, it is transparent at the designated wavelength.

Thus, by measuring the optical density of the specimen-reagent mixture at the designated wavelength, the amount of the coenzyme present in one form of the other may be determined. More specifically, by measuring the amount of change, or rate of change, of the optical density at the designated wavelength, the amount or rate of the assay reaction may be measured.

Typically, it has been found that the pyridine nucleotides (diphosphonucleotide and triphosphonucleotide) are particularly well suited for this purpose. When they are in their oxidized form, they have an optical absorption at a wavelength of about 340 millimicrons.

By means of the present teachings a sample mixing and measuring structure is furnished which may be produced at minimal cost. Therefore the assembly may have a "one time" use, after which is may be discarded. The structure will not require cleaning before or after use, and may be employed by technicians who need not be as highly skilled and trained as have heretofore been required, where conventional assemblies have been used, with their attendant sampling errors.

It is a general object of the present invention to provide an improved sample holder for placement in a photometric analyzing apparatus.

It is another object of the invention to provide a measuring assembly which, because of its improved functional accuracy, low cost, simplicity of manufacture, and efficiency of operation, will encourage greater use of semi-automatic laboratory techniques for diagnostic purposes.

Another object is that of providing a structure which will include relatively few components, each individually simple and rugged in construction, and capable of ready assemblage to furnish an economical and unitary apparatus. Therefore, the complications heretofore existing in connection with cleaning and the dangers of inaccurate results obtained are greatly minimized.

Yet another object of the invention is to furnish a structure which will not require the services of a skilled operator, although the results obtained by the use of the improved assembly will be entirely reliable, and the accuracy may be depended upon.

It is still another object of this invention to permit the accurate addition and mixing of reagents with a sample to be analyzed.

Other objects, advantages and modifications of this invention will become apparent to those skilled in the art without departing from the scope and spirit of this invention, and it should be understood that the latter is not necessarily limited to the aforementioned discussion. Now follows a detailed description, set forth in conjunction with the accompanying drawing in which:

FIGURE 8 is a top plan view of the disc-shaped plug component of FIGURE 1;

FIGURE 9 is a vertical section taken on the plane indicated by the line 9—9 in FIGURE 8;

FIGURE 10 is an elevational view of the plug component of FIGURE 8;

FIGURE 11 is a vertical section partially broken away taken on the plane indicated by the line 11—11 in FIGURE 10;

FIGURE 12 is a bottom plan view of the optical measuring insert of this invention;

FIGURE 13 is a top plan view of the insert of FIGURE 12;

FIGURE 14 is a vertical section taken on the plane indicated by the line 14—14 in FIGURE 13;

FIGURE 15 is a section taken on the plane indicated by the line 15—15 in FIGURE 13;

FIGURE 16 is a vertical section, partially broken away, of the enlarged lower portion of the liquid reagent reservoir component of FIGURE 1;

FIGURE 17 is an exploded view in elevation of the components of an alternate embodiment of the invention arranged in the order of their assembly at the time a spectrophotometric determination is made;

FIGURE 18 is a vertical section of the upper three components of FIGURE 17 as assembled during storage prior to the conduct of a determination;

FIGURE 18a is an enlarged view of encircled portion 18a of FIGURE 16, showing the detail of the components as mated;

FIGURE 19 is an elevational view of the disc-shaped plug insert component of the embodiment of FIGURE 17;

FIGURE 20 is a vertical section of the plug insert of FIGURE 19;

FIGURE 21 is a bottom plan view of the optical measuring insert of an alternate embodiment of this invention;

FIGURE 22 is a top plan view of the insert of FIGURE 21;

FIGURE 23 is a vertical section taken on the plane indicated by the line 23—23 in FIGURE 22;

FIGURE 24 is a vertical section taken on the plane indicated by the line 24—24 in FIGURE 22; and FIGURE 25 is an enlarged elevational view of another embodiment of the upper plug.

Figure 1:
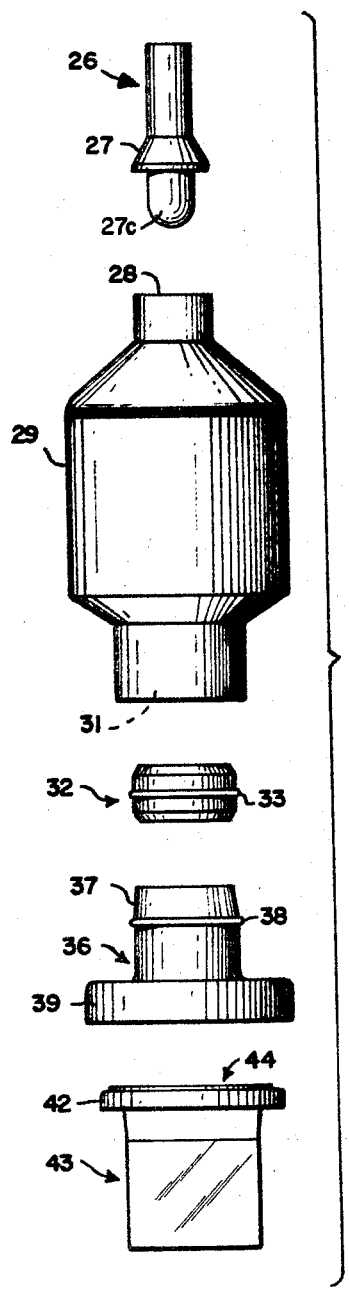
FIGURE 1 is an exploded view in elevation of the components of a preferred embodiment of the invention arranged in the order of their assembly at the time a spectrophotometric determination is made.

Referring now to the drawing, wherein like parts have been designated by like reference numerals and to FIGURE 1, in particular, in which a preferred form of the mixing and measuring assembly has been shown, the numeral 26 indicates a plug provided with a tapered shoulder 27, which is sized to detachably seal with the constricted upper opening 28 of a liquid reagent reservoir 29. Rounded tip 27c of plug 26 facilitates the wiping off of any adhering liquid.

A second less constricted lower opening 31 is provided in a neck portion of reservoir 29. Openings 28 and 31 are of sufficient length to provide an internally smooth annular surface permitting sealing contact with plug 26 and a lower disc-shaped plug 32, respectively. The latter plug 32 is provided with a peripheral ridge 33 that locks with an annular groove 34 (see FIGURE 2) disposed in the inner face of opening 31.

The reservoir 29 is preferably of a semi-rigid chemically inert synthetic resin, such as polyolefin, for example, polyethylene or polypropylene, and of fairly close tolerances, so as to provide for proper and leakproof mating of components, and also for proper juxtaposition of the assembly in the spectrometric device. Additionally this permits compressing the reservoir to aid emptying of the pipette.

Figure 2:
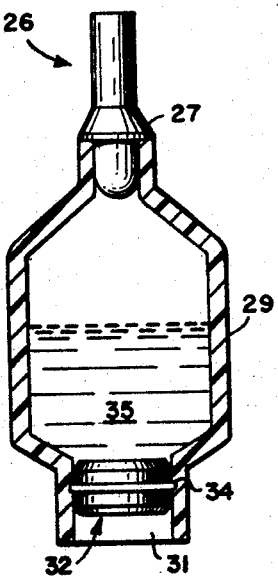
FIGURE 2 is a vertical section of the three upper components of FIGURE 1 as they can be assembled during storage prior to the conduct of a determination.

FIGURE 2 shows the sealed reservoir unit 29 as it is stored until use, usually containing a fixed volume of a diluent liquid 35, such as chemically pure water. The locked positions of plugs 26 and 32 are intended to retain the liquid without leakage until the plug 32 is dislodged therefrom.

A snap-on connector 36 has a reduced and slightly tapered upper end 37 defined by a peripheral ridge 38, that snap-locks with groove 34 while the connector is disposed within opening 31. Additionally, the height of end 37 is adapted to permit sealing engagement with the annular surface of opening 31 prior to contacting and dislodging plug 32 inwardly.

Enlarged lower end 39 thereof is provided with an inwardly projecting annular ridge 41 (better seen in FIGURE 3), adapted to detachably snap-fit over the upper flanged end 42 of hollow optical measuring insert 43.

Figure 3:
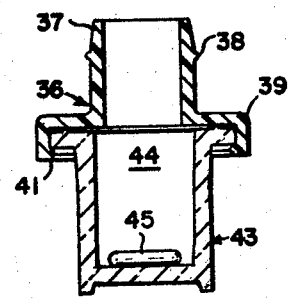
FIGURE 3 is a vertical section of the two lower components of FIGURE 1 as they are assembled just prior to the conduct of a measurement.

The insert 43 (as best seen in FIGURE 3) is provided with an opening 44 to permit communication with reservoir 29 via connector 36. Insert 43 is adapted to be capped with connector 36, optionally having a tableted or capsulized reagent 45 disposed therein, and positioned to be mated with sealed reservoir 29.

The reagent may be already dissolved in the diluent at the time of filling by introducing a specimen into the reservoir. In this case, the volume of liquid reagent 35 is directly related to the volume of specimen to be introduced therein.

Insert 43 is preferably molded from a thermosetting resin which is optically clear at the wavelength at which it is to be used, for example, an acrylic resin, such as methylmethacrylate. Typically, Plexiglas V–100–NF, supplied by the Rohm & Haas Chemical Company, which is uncolored and free of any ultraviolet attenuating ingredient, has been found suitable for use at 340 millimicrons.

Other resins which are uncolored, which desirably have the property of low light attenuation at the wavelength at which they are to be employed and preferably provide a substantially flat light attenuation where they are to be employed, are useful in this invention.

Other plastics, like polycarbonate resins, for example, Lexan, supplied by the General Electric Company, is suitable for use in the molding of the insert component of this invention. It should be noted, also, that less desirable materials, i.e., more fragile and/or more expensive to mold, such as glass, which have been used in prior art curvettes, may be usefully employed in this invention. Light ranges which may find utility in this invention may range from 290–750 millimicrons in wavelength.

Insert 43 will be molded to a close tolerance, so as to consistently provide, from one disposable insert to another, a liquid light path of a fixed length, typically one centimeter.

When all the components have been mated as during use (seen in FIGURE 4), this permits the dissolving of the reagent tablet in the diluent, followed by removal of plug 26 preparatory to introduction of the fluid specimen containing the unknown to be measured.

Figures 4, 5:
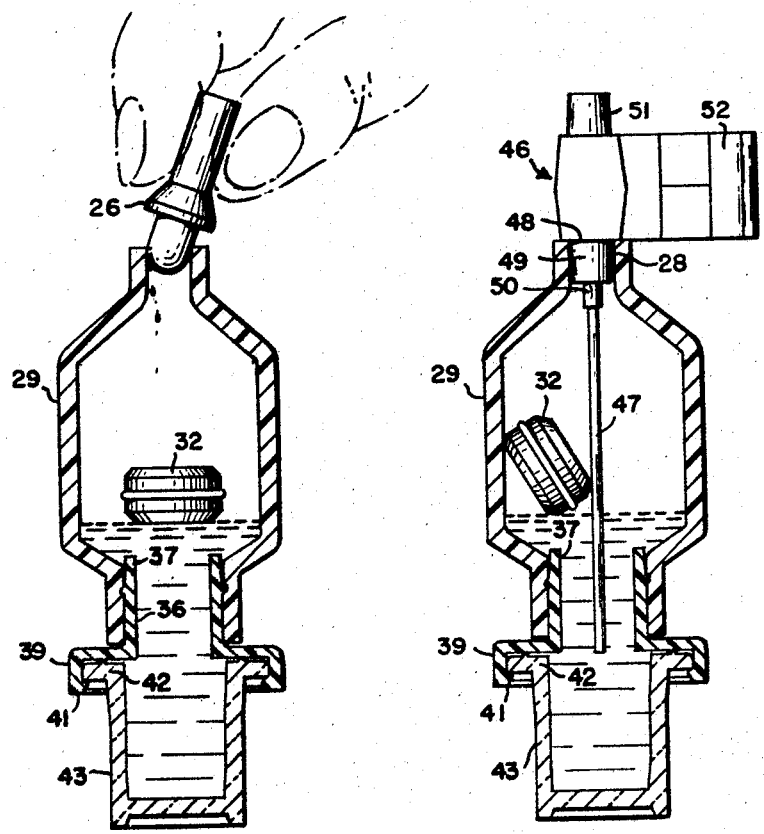
FIGURES 4 to 5 are somewhat schematic and partly sectional views illustrative of the steps of introducing a measured amount of fluid specimen containing an unknown into the assembled components.

The introduction of said specimen can be made from a pipette 46 (as seen in FIGURE 5) followed by replacement of plug 26 (not shown), to permit manual mixing of all the contents. Then, observation of the optical density of the resulting reaction in a spectrophotometric device, is taken through insert 43. It will be seen that plug 32, while disposed internally of the reservoir, conveniently serves a mixing function.

Figure 6:
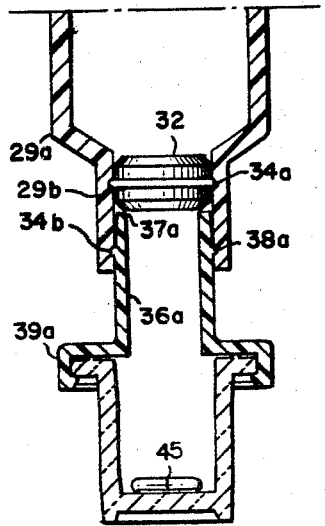
FIGURE 6 is a vertical section, partially broken away, of an alternate embodiment of the invention.

An alternate embodiment of connector 36 is seen in FIGURE 6. Connector 36a is identical with connector 36 except upper end 37a is somewhat elongated, with peripheral ridge 38a being similarly spaced from the lip thereof. This embodiment permits the partial mating of reservoir unit 29a, identical with reservoir 29 except for having a modified neck 29b, with connector 36a and the attached insert 43 (as shown) at the time a specimen is taken and introduced into the reservoir with ridge 38a engaged in a groove 34b. The joined components can be stored temporarily with plug 32 having ridge 33 engaged in groove 34a, until the actual reading is to be taken. At the desired time the connector 36a is pushed fully into the reservoir, in order to dislodge plug 32, thus permitting complete commingling of reagents, liquid diluent and specimen, and the initiation of the catalytic reaction.

Pipette 46 (FIGURE 5) is a commercially available micropipette assembly adapted for use with the other components of the novel measuring assembly of this invention. The numeral 47 indicates the capillary tube, the inner end of which is mounted upon a sleeve 48, mounted in reservoir opening 28. Tube 47 provides the pipette proper, which may be produced by employing a suitable plastic material of the thermosetting resin type, but it is preferably manufactured of glass. Sleeve 48 may be formed of a thermoplastic material, although other materials can be employed.

The inner end of sleeve 48 preferably defines a terminal base portion 49, having a reduced collar 50 included as part of its end wall. The bore of collar 50 has a diameter such that it securely receives the upper end of the tube 47 which has its upper end terminating within the zone of collar 50.

The outer end of sleeve 48 terminates in a reduced portion 51 communicating with the tube 47, which is also adapted to be sealingly received within the opening 28 of the reservoir. Reservoir 29, as previously indicated, should be formed of a semi-rigid plastic, and therefore compressible to vary its internal volume. A manipulation member 52 is conveniently mounted on sleeve 48. U.S. Patent 3,045,494, issued July 24, 1962, supplies an extensive description of this micropipette assembly.

The preferably concave surfaces 53a and 53b of plug 32 are seen in FIGURE 9, which configuration facilitates molding.

Optical insert 43 is provided with slightly tapered walls 43a and 43b in the lower portion thereof, which is best depicted in FIGURE 15. These tapered walls provide for accurate alignment in the spectrophotometer. The other pair of upstanding walls have parallel portions 43c and 43d of uniform thickness through which the beam of light, indicated at 58 of FIGURE 15, from the spectrophotometer passes.

Optical insert 43 has a substantially circular configuration for the outer periphery of flange 42 (FIGURE 13) which is engaged by the lower end 39 by connector 36 (FIGURE 1).

Insert 43 is further provided with a rectangular recess 57 (FIGURES 14 and 15) therein defining the lower surface, which is conveniently provided for the purpose of having all walls of the insert of roughly the same thickness.

Another preferred embodiment of the invention, as shown in FIGURE 17, has a plug 26a provided with an enlarged lower portion 27a, having a plurality of peripheral ridges 59a on the periphery thereof, adapting same to sealing engagement with upper opening 28a of reservoir 29c. Peripheral ridges 60 on the upper portion of plug 26a aid in the grasping of the plug.

A less constricted opening 31a is provided on the lower end of the reservoir 29c, the inner surface of which is further provided with an annular bevel 61 (shown in FIGURE 18a) that mates with peripheral ridge 33a on plug 32a. The lower surface 62 of plug 32a is flanged slightly to lock with annular ridges 63 of reservoir 29c.

In this embodiment, the connector 36 and insert 43 of FIGURE 1 are combined into a single insert 64, the optical section 43e of which, is functionally comparable to insert 43 of the first embodiment. As an integral part of the insert, there is provided an annular upwardly extending projection 65, which is optionally of the same optically clear plastic as the lower portion, since they are most readily molded as a single component. The periphery of section 65 makes sealing contact with the smooth annular surface of opening 31a of reservoir 29c. A diameter-reducing taper 66 on insert 64 is provided to facilitate its proper registration with lower circular recess 67 (FIGURE 20) in disc-shaped plug 32a, upon insertion into opening 31a.

The sealed reservoir unit is stored until use as shown in FIGURE 18, containing a fixed volume of diluent 35a, The diluent is retained by upper plug 26a and lower disc-like plug 32a until the latter is removed therefrom by being displaced inwardly using projection 65 of insert 64.

As best seen in FIGURE 20, plug 32a also preferably has concave-shaped recesses 53c and 53d.

Optical insert 64 is provided with slightly tapered walls 64a and 64b in the lower portion thereof, which is best depicted in FIGURE 24. These tapered walls provide for accurate alignment in the photometer. The other pair of upstanding walls have parallel portions 64c and 64d of uniform thickness, through which the beam of light, indicated at 58a (FIGURE 24) from the spectrophotometer passes.

Insert 64 is similarly provided with rectangular recess 68 for roughly uniform wall thickness (FIGURES 23 and 24).

Insert 64 has a substantially circular configuration for the outer periphery of flange 42a thereof, which is engaged by the lower end of reservoir 29a.

A third embodiment of an upper plug means is shown in FIGURE 25, adaptable for use with the measuring assemblies of FIGURES 1 and 15. Plug 26b is provided with an enlarged middle section 27b, forming a shoulder 72. Lower shank portion 73 is provided with a plurality of peripheral ridges 74 terminating in cone 75, which insure sealing engagement with opening 28 or 28a, respectively. Shoulder 72 limits the degree of plug insertion, and avoids its inadvertent pushing into the reservoir.

The configuration of both of inserts 43 and 64 permit their manual handling throughout the entire mixing and measuring steps, without the need for finger touching of the external optical surfaces (see FIGURE 7), thereby avoiding errors due to smear distortion of the optical light path through the inserts. Moreover, if the inserts tip over, their optical surfaces will not touch the surfaces on which they come to rest.

Figure 7:
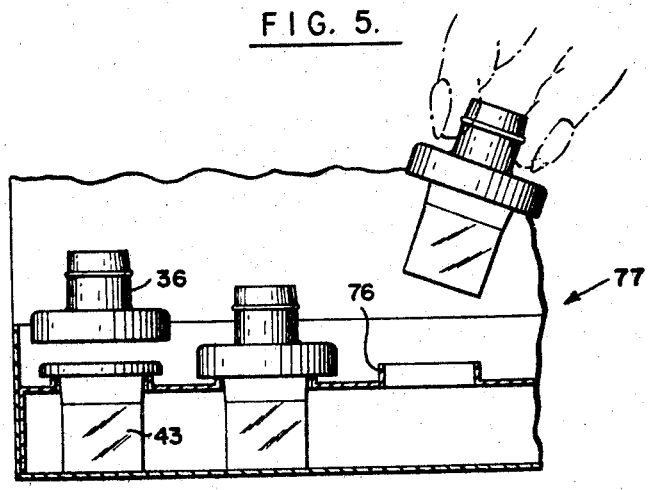
FIGURE 7 is a somewhat schematic and sectional view of a plurality of optical inserts of FIGURE 3 in a storage container.

In operation, a single insert 43 is withdrawn from nest 76 of insert container 77 by the snapping on of a connector 36 (see FIGURE 7).

The dry reagent 46 may have been stored, or been inserted just prior to use, in the optical insert 43. With the components coupled (as shown in FIGURE 4), the liquid stored in reservoir 29 is allowed to flow and fill the insert section, thus causing the dissolution of the dry reagent 46. Then an initial reading may be taken for optical density of unreacted reagent.

After completion of the chemical reaction, which occurs upon addition via a pipette 48, or the like, of the specimen fluid, the optical insert, filled with reagent-specimen reaction solution, allows for the accurate remeasurement of the attenuation of the light beam by the reacted solution.

Thus, the total change, or rate of change, in optical density of the liquid mixture indicates the activity or concentration of the unknown in the specimen, by instruments well known in the art, which do not form a part of the present invention.

The operation of the other described embodiments are essentially the same as the above-described operation.

What is claimed is:

1. A mixing and measuring assembly for use in making photometric measurements including in combination:
   a reservoir having a neck portion with an opening therein;
   a displaceable closure means to sealingly close said opening and being slideable along said neck portion into said reservoir;
   a pipette having an exposed tube end containing a liquid specimen, with the other tube end being open to the atmosphere, from which said specimen is introduced into said reservoir;
   a hollow measuring insert having walls of an optically clear material providing a light path of fixed length through a liquid contained therein; and
   means connected to said measuring insert to sealingly engage the inner surface of said neck portion, whereupon said reservoir and said measuring insert come into fluid communication as said displaceable closure means is urged inwardly of its sealing engagement with said neck portion opening and into said reservoir.

2. The assembly of claim 1 wherein said insert comprises an optically clear acrylic or polycarbonate resin.

3. The assembly of claim 2 wherein said resin comprises methyl methacrylate.

4. The assembly of claim 1 wherein said reservoir comprises a synthetic resin.

5. The assembly of claim 4 wherein said reservoir resin is a polyolefin.

6. The assembly of claim 4 wherein said reservoir resin is a polyethylene.

7. The assembly of claim 1 wherein the opening of said reservoir has an annular groove and said displaceable closure means has an annular ridge to sealingly engage said groove.

8. The assembly of claim 1 wherein said measuring insert has a flange on the upper surface thereof to avoid touching of the measuring side walls against any surface upon which it falls.

9. The assembly of claim 1 wherein said measuring insert has upstanding walls being tapered to facilitate registration in a device used for the photometric measurement.

10. A mixing and measuring assembly for photometric measurement adapted for use with a pipette having an exposed end, including in combination:

a reservoir having an upper opening, sized so that the exposed end of said pipette is insertable through said opening to extend into the interior of said reservoir, for the discharge of a liquid specimen heretofore retained within the pipette;

a lower opening in said reservoir;

a displaceable plug sized to sealingly engage said lower opening and being slideable into said reservoir;

a hollow measuring insert having an opening only in the top thereof composed of an optically clear material having a light path of fixed length through said measuring insert;

a hollow connector having means at one end thereof to detachably engage said measuring insert; and means at the other end of said hollow connector to sealingly engage the inner surface of said lower reservoir opening, and to urge said plug inwardly of its sealing engagement with said lower opening into said reservoir whereupon said reservoir and said insert come into fluid communication.

11. A mixing and measuring assembly for photometric measurement and adapted for use with a pipette having an exposed end, including in combination:

a reservoir, said reservoir having an upper opening, sized so that the outer end of said pipette is insertable through said upper opening to extend into the interior of said reservoir for the discharge of specimen heretofore retained within the pipette, and having a lower opening;

a displaceable plug sized to sealingly engage the lower opening in said reservoir and being slideable into said reservoir;

a hollow measuring insert having an opening in the top thereof and composed of an optically clear material and having a light path of fixed length through said measuring insert; and means connected to said measuring insert to sealingly engage the inner surface of said lower reservoir opening, and to subsequently urge said displaceable plug inwardly of its sealing engagement with said second opening and into said reservoir, whereupon said reservoir and said insert come into fluid communication.

12. The assembly of claim 1 wherein the reservoir is molded from a chemically inert synthetic material.

References Cited

UNITED STATES PATENTS

| | | | |
|---|---|---|---|
| 1,280,194 | 10/1918 | Earp-Thomas | 23—253 |
| 2,359,736 | 10/1944 | Kienle et al. | |
| 2,896,502 | 7/1959 | Nordin. | |
| 3,142,719 | 7/1964 | Farr. | |
| 3,145,876 | 8/1964 | McBrien. | |
| 3,177,706 | 4/1965 | Shuman et al. | |
| 3,246,559 | 4/1966 | Clifford. | |
| 3,263,554 | 8/1966 | Pickels. | |
| 3,332,316 | 7/1967 | Saunders. | |

JEWELL H. PEDERSEN, Primary Examiner

WARREN A. SKLAR, Assistant Examiner

U.S. Cl. X.R.

23—253, 259; 250—218; 356—208